(12) United States Patent
Maeda

(10) Patent No.: US 8,707,786 B2
(45) Date of Patent: Apr. 29, 2014

(54) OBJECT DETECTION APPARATUS

(75) Inventor: Yuki Maeda, Yokohama (JP)

(73) Assignee: Murata Manufacturing Co., Ltd., Nagaokakyo-shi, Kyoto-Fu (JP)

( * ) Notice: Subject to any disclaimer, the term of this patent is extended or adjusted under 35 U.S.C. 154(b) by 622 days.

(21) Appl. No.: 12/751,034

(22) Filed: Mar. 31, 2010

(65) Prior Publication Data

US 2010/0180685 A1 Jul. 22, 2010

Related U.S. Application Data

(63) Continuation of application No. PCT/JP2008/066523, filed on Sep. 12, 2008.

(30) Foreign Application Priority Data

Oct. 1, 2007 (JP) ................................. 2007-257333

(51) Int. Cl.
*G01N 29/48* (2006.01)
*G01N 29/32* (2006.01)
*G01S 3/801* (2006.01)

(52) U.S. Cl.
USPC .............................. 73/602; 367/125; 367/124

(58) Field of Classification Search
USPC .............. 73/602; 367/105, 99, 118, 124–126; 342/70, 71, 72, 27, 28, 118
See application file for complete search history.

(56) References Cited

U.S. PATENT DOCUMENTS 4,512,000 A * 4/1985 Masuko ........................... 367/93
4,604,735 A * 8/1986 Parsons ........................... 367/93

(Continued)

FOREIGN PATENT DOCUMENTS

JP 56-160673 A 12/1981
JP 4-263395 A 9/1992

(Continued)

OTHER PUBLICATIONS

PCT/JP2008/066523 International Search Report dated Jul. 10, 2008.

(Continued)

*Primary Examiner* — Peter Macchiarolo
*Assistant Examiner* — Rose M Miller
(74) *Attorney, Agent, or Firm* — Dickstein Shapiro LLP

(57) ABSTRACT

The transmission of a detection wave and the reception of a reflected wave are periodically repeated every transmission period. One received signal is compared with another received signal at a similar corresponding comparison periods in different transmission periods of a receiving time of the reflected wave. Switching between the comparison periods is performed each time the transmission period is updated. A waveform of a received signal in a block A0 corresponding to a reflected wave of an ultrasonic signal transmitted in a first transmission period is stored. The absolute values of differences between the waveform of a received signal in a block A1 corresponding to a reflected wave of an ultrasonic signal transmitted in a second transmission period and the stored waveform of the received signal in the block A0 are accumulated. The waveform of a received signal in a block B1 is stored. The absolute values of differences between the waveform of a received signal in a block B2 corresponding to a reflected wave of an ultrasonic signal transmitted in a third transmission period and the stored waveform of the received signal in the block B1 are accumulated. Similar processing is performed in each block and a final accumulated value is set as the amount of change.

4 Claims, 4 Drawing Sheets

(56) References Cited

U.S. PATENT DOCUMENTS

| | | | |
|---|---|---|---|
| 5,177,711 A | * | 1/1993 | Yamaguchi et al. .......... 367/105 |
| 5,237,306 A | * | 8/1993 | Adell ............................ 340/469 |
| 5,237,308 A | | 8/1993 | Nakamura |
| 5,565,870 A | * | 10/1996 | Fukuhara et al. ............... 342/70 |

FOREIGN PATENT DOCUMENTS

| | | |
|---|---|---|
| JP | 05027028 A * | 2/1993 |
| JP | 10-160839 A | 6/1998 |
| JP | 11-133151 A | 5/1999 |
| JP | 2006-343218 A | 12/2006 |

OTHER PUBLICATIONS

PCT/JP2008/066523 Written Opinion dated Jul. 10, 2008.

* cited by examiner

OBJECT DETECTION APPARATUS

CROSS REFERENCE TO RELATED APPLICATIONS

The present application is a continuation of International Application No. PCT/JP2008/066523, filed Sep. 12, 2008, and claims priority to Japanese Patent Application No. JP2007-257333, filed Oct. 1, 2007, the entire contents of each of these applications being incorporated herein by reference in their entirety.

FIELD OF THE INVENTION

The present invention relates to object detection apparatuses for detecting objects by transmitting and receiving a detection wave, and, more particularly, to an object detection apparatus for detecting objects including a human body in narrow space in which a detection wave is multiple-reflected.

BACKGROUND OF THE INVENTION

Patent Documents 1 to 3 disclose apparatuses for detecting whether a person is present by intermittently transmitting an ultrasound wave in a monitoring space, receiving a reflected wave of the ultrasound wave, and comparing the waveform of a received signal corresponding to the reflected wave and the waveform of a received signal obtained when no person is present.

FIG. 1 is a block diagram illustrating a configuration of an ultrasonic human body sensor disclosed in Patent Document 1. Referring to FIG. 1, an ultrasonic human body sensor 10 includes an oscillation unit 1, a boosting circuit 2, an ultrasonic wave transmission/receiving unit 3, a receiving/detection circuit 4, a received waveform conversion unit 5, a reference waveform storage unit 6, and a determination unit 7.

The oscillation unit 1 for generating an ultrasonic pulse signal is controlled by the determination unit 7. A generated ultrasonic range pulse is output to the boosting circuit 2. The determination unit 7 controls the oscillation unit 1 so that an ultrasonic range pulse continuing for a predetermined period is intermittently output at predetermined time intervals.

The voltage of the ultrasonic range pulse output from the oscillation unit 1 is raised by the boosting circuit 2. The ultrasonic wave transmission/receiving unit 3 intermittently transmits an ultrasonic wave continuing for a predetermined period in monitoring space with an ultrasonic range pulse signal having a raised high voltage. A received signal corresponding to a reflected wave of each transmitted ultrasonic wave is detected by the receiving/detection circuit 4 and is then input into the received waveform conversion unit 5.

The received signals corresponding to reflected waves of ultrasonic waves that have been intermittently transmitted are subjected to receiving masking, are sequentially sampled at predetermined time intervals, are subjected to A/D conversion by an A/D conversion unit or the like included in the received waveform conversion unit 5, and are converted into received waveform data composed of a plurality of digital sampling values.

The determination unit 7 compares the received waveform data with reference waveform data and outputs a detection signal when detecting that a human body is present in the monitoring space. More specifically, the determination unit 7 calculates the difference between a received waveform stored in the reference waveform storage unit which is obtained when no person is present and a current waveform for each A/D sampling value and calculates the sum of these differences. When the sum of these differences is equal to or larger than a threshold value set in advance, the determination unit 7 determines that a human body is present. At the time of determination, the determination unit 7 divides the received waveform into a near region and a far region and calculates the sum of differences in each of the near region and the far region. As a result, determination is more accurately performed.

FIG. 2 is a waveform diagram illustrating an operation of an ultrasonic sensor disclosed in Patent Document 2. An ultrasonic sensor disclosed in Patent Document 2 outputs "1" when a reflected wave is present in a minute zone and "0" when no reflected wave is present and compares reference data of a reflected wave with a received signal in each minute zone.

In a sensor disclosed in Patent Document 3, a transmitter intermittently transmits an ultrasonic wave in monitoring space, a receiver receives a reflected wave generated by the reflection of the transmitted ultrasonic wave from an object, a binarization circuit converts the waveform of the received reflected wave into current binarized information, a comparison circuit compares the current binarized information with binarized information stored in advance in a storage device which has been obtained when no person is present in the monitoring space, and it is determined that a person is present in the monitoring space when the current binarized information differs from the stored binarized information.

[Patent Document 1] Japanese Unexamined Patent Application Publication No. 2006-343218
[Patent Document 2] Japanese Unexamined Patent Application Publication No. 5-27028
[Patent Document 3] Japanese Unexamined Patent Application Publication No. 56-160673

However, the sensors disclosed in Patent Documents 1 to 3 need storage devices having a capacity for storing the waveforms of reflected waves obtained in a whole measurement period. Accordingly, in the case of a wide monitoring area or a monitoring area in which a reflected wave stays for a long period, a memory with a large capacity is required. This leads to the increase in cost and size.

SUMMARY OF THE INVENTION

It is an object of the present invention to provide an inexpensive and small object detection apparatus by reducing a storage capacity of the object detection apparatus and an entire circuit size without reducing a detection ability.

In order to solve the above-described problem, the present invention has the following configuration. (1) An object detection apparatus for transmitting a detection wave (ultrasonic wave), receiving a reflected wave of the detection wave from an object (for example, a person), and detecting the object on the basis of a received signal corresponding to the reflected wave includes: a received signal comparer for periodically repeating transmission of the detection wave and reception of the reflected wave at every transmission period and comparing one received signal with another received signal at a similar corresponding comparison periods in different transmission periods of a receiving time of the reflected wave over a predetermined time; and a comparison period switcher for switching between the comparison periods each time the transmission period is updated.

A waveform of a reflected wave in a waveform comparison period is compared with a waveform of a reflected wave in a past corresponding waveform comparison period. Since the waveform comparison period is a part of a period in which a reflected wave is present, a storage capacity for storing information about the waveform in the past corresponding waveform comparison period can be reduced. As a result, the reduction in an entire circuit size, cost reduction, and miniaturization are achieved.

(2) The received signal comparer stores in a storage device a waveform of a signal intensity received in the comparison period in a predetermined (last) transmission period and compares the waveform stored in the storage device with a waveform of a signal intensity received in the corresponding comparison period in a current transmission period.

Since the waveform of a received signal intensity in a comparison period is compared with the waveform of a reference received signal intensity, it is possible to increase detection accuracy in accordance with the resolutions of a time axis and an intensity axis.

According to the present invention, it is possible to reduce a storage capacity for storing past waveform information and an entire circuit size. This leads to cost reduction and size reduction.

Figure 1:
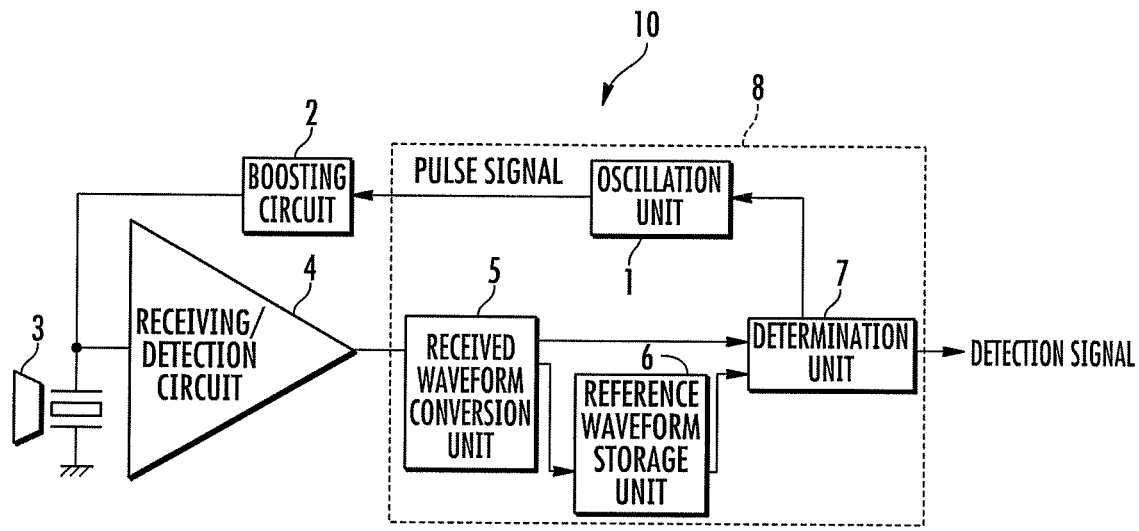
FIG. 1 is a block diagram illustrating a configuration of an ultrasonic human body sensor disclosed in Patent Document 1.
Figure 2:
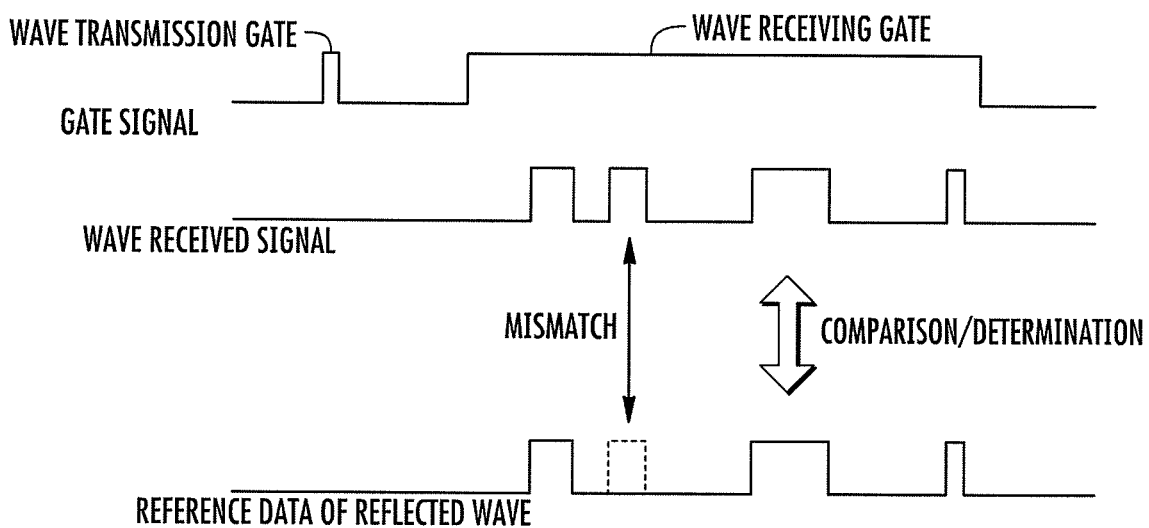
FIG. 2 is a waveform diagram illustrating an operation of an ultrasonic sensor disclosed in Patent Document 2.

REFERENCE NUMERALS 23 ultrasonic sensor
40 digital signal processing circuit
100 object detection apparatus

DETAILED DESCRIPTION OF THE INVENTION

Figure 3:
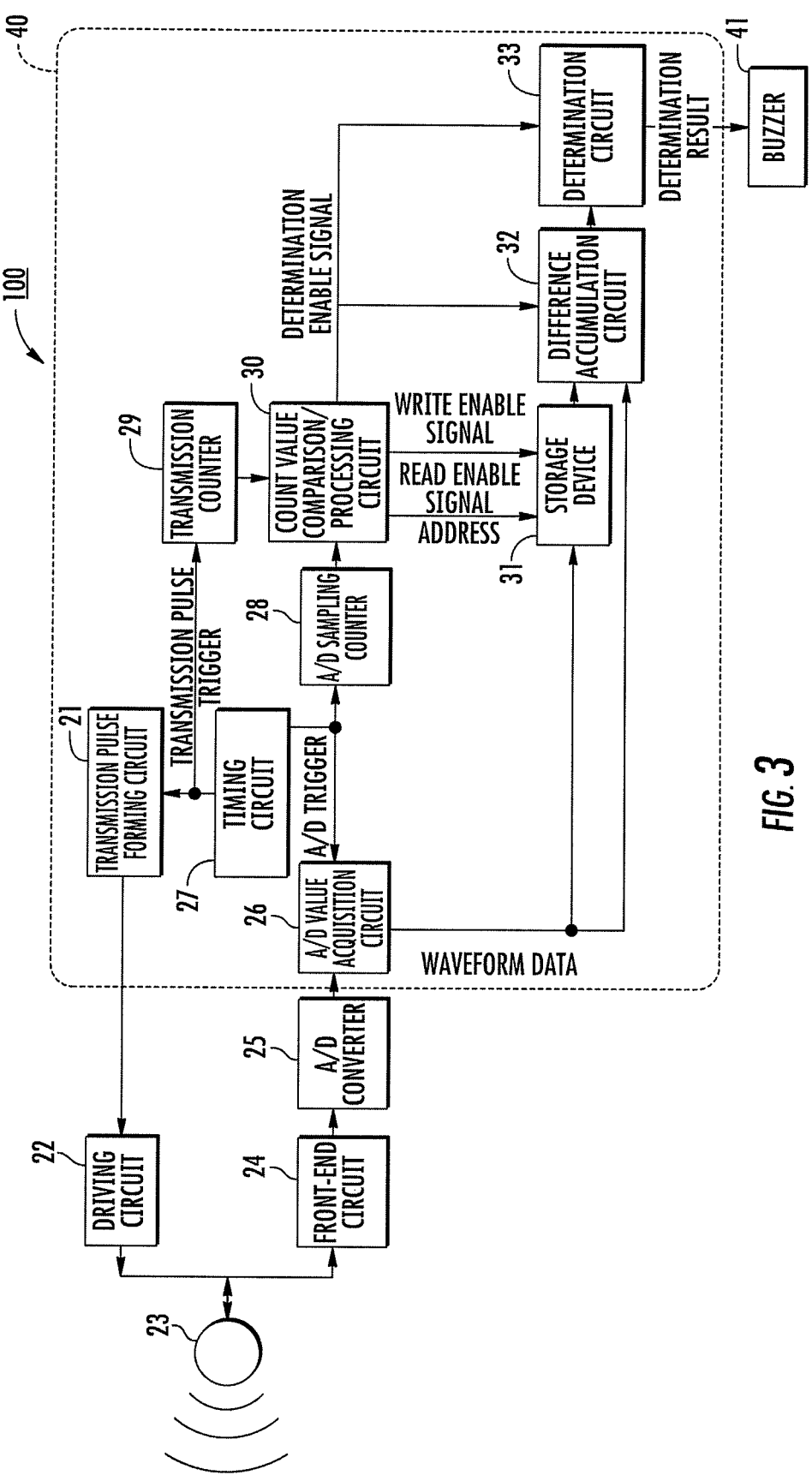
FIG. 3 is a block diagram illustrating a configuration of an object detection apparatus according to the present invention.

An object detection apparatus according to an embodiment of the present invention will be described with reference to FIGS. 3 to 5. FIG. 3 is a block diagram of an object detection apparatus according to an embodiment of the present invention. An object detection apparatus 100 according to an embodiment of the present invention includes an ultrasonic sensor 23, a driving circuit 22 for driving the ultrasonic sensor 23, a front-end circuit 24 for amplifying a signal received from the ultrasonic sensor 23, an A/D converter 25 for performing A/D conversion upon a voltage output from the front-end circuit 24, a digital signal processing circuit 40 for outputting a transmission pulse to the driving circuit 22, receiving an output value of the A/D converter 25, and performing processing to be described later, and a buzzer 41 driven by a signal output from the digital signal processing circuit 40.

The configuration of the digital signal processing circuit 40 is as follows. A timing circuit 27 supplies a transmission pulse trigger to a transmission pulse forming circuit 21 and a transmission counter 29. The transmission pulse forming circuit 21 generates an ultrasonic burst signal in response to the transmission pulse trigger and outputs the ultrasonic burst signal to the driving circuit 22.

The transmission counter 29 starts a count operation after receiving the transmission pulse trigger. The timing circuit 27 also outputs an A/D trigger signal to an A/D value acquisition circuit 26 and an A/D sampling counter 28. The A/D value acquisition circuit 26 controls the A/D converter 25 in response to the A/D trigger signal and acquires a digital value output from the A/D converter 25.

The A/D sampling counter 28 performs a count-up operation in response to the A/D trigger signal.

A count value comparison/processing circuit 30 acquires a low-order digit of a count value output from the A/D sampling counter 28 as an address value for a storage device (memory) 31, and compares the count value output from the A/D sampling counter 28 with a count value output from the transmission counter 29 so as to determine a time at which reading/writing of data from/in the storage device 31 is performed and the address of the storage device 31.

The storage device 31 is a memory for storing past waveform information used for comparison between received signals obtained in comparison periods and has a capacity corresponding to (proportional to) a comparison period. The storage device 31 stores a value acquired by the A/D value acquisition circuit 26 at an address corresponding to an address value output from the count value comparison/processing circuit 30 when a write enable signal output from the count value comparison/processing circuit 30 is valid, and outputs a value to a difference accumulation circuit 32 on the basis of an address value output from the count value comparison/processing circuit 30 when a read enable signal output from the count value comparison/processing circuit 30 is valid. The count value comparison/processing circuit 30 corresponds to the comparison period switcher according to the present invention.

The difference accumulation circuit 32 is a computation circuit for calculating a difference (an absolute value) between a waveform stored in the storage device 31 and a waveform output from the A/D value acquisition circuit 26 for each sampling value and accumulating these differences.

A determination circuit 33 outputs a determination result to the buzzer 41 when a result of computation performed by the difference accumulation circuit 32 exceeds a threshold value set in advance. The buzzer 41 sounds in accordance with the determination result output from the determination circuit 33.

The determination circuit 33 performs determination on the basis of an output value of the difference accumulation circuit 32 in response to a determination enable signal output from the count value comparison/processing circuit 30 (a signal output after a comparison period has elapsed). The difference accumulation circuit 32 and the determination circuit 33 correspond to the received signal comparer according to the present invention.

Figure 4:
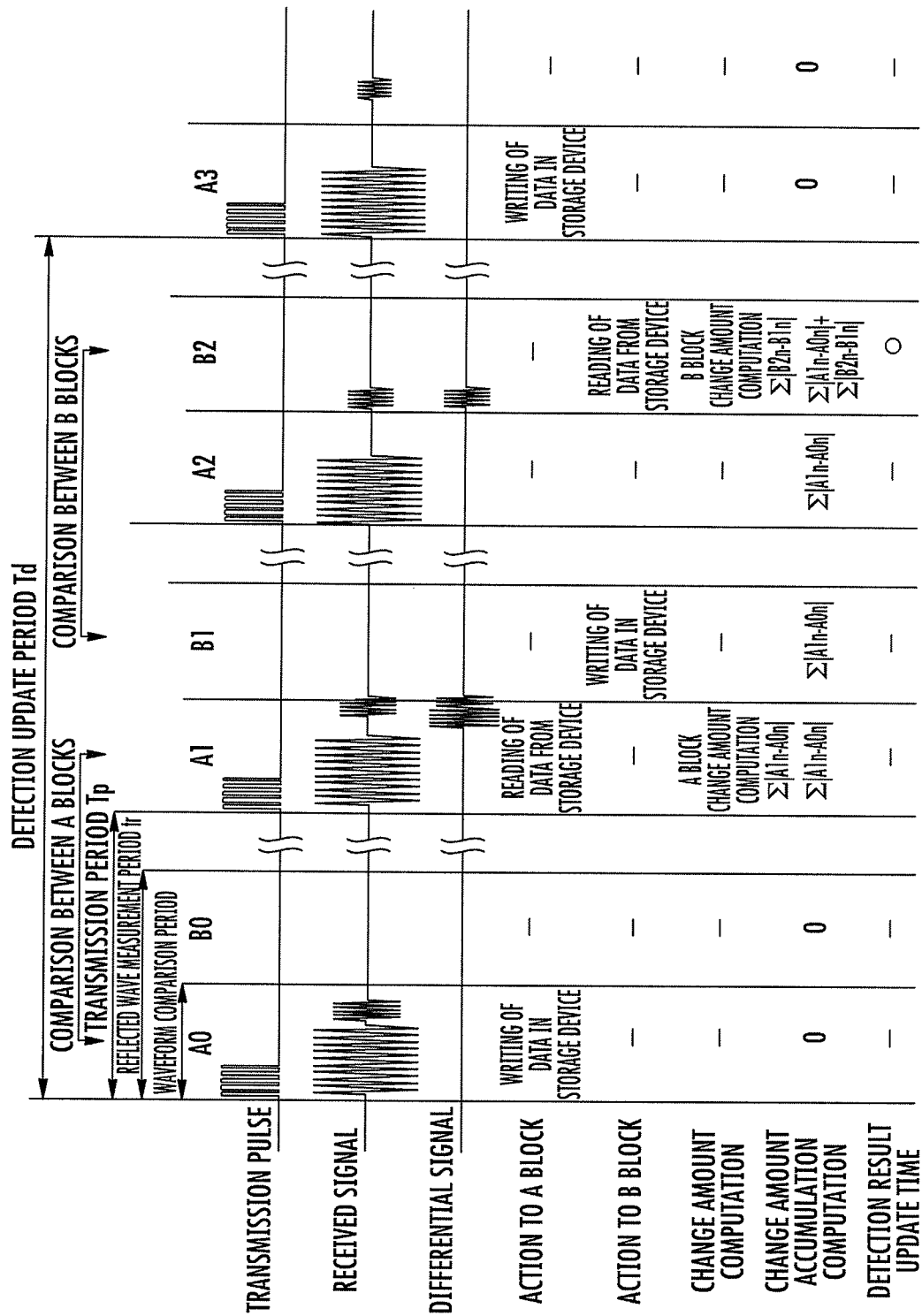
FIG. 4 is a diagram illustrating a sequence of operations performed by the object detection apparatus.

FIG. 4 is a diagram illustrating the relationship among times at which the object detection apparatus 100 illustrated in FIG. 3 performs operations. In this example, in order to reduce the memory capacity of the storage device 31 illustrated in FIG. 3 by half, a reflected wave measurement period tr (=10 ms) is divided into two comparison periods A and B. A subscript added to each of blocks A and B represents the ordinal number of a transmission period.

Referring to FIG. 4, "transmission pulse" represents a signal output from the transmission pulse forming circuit 21 illustrated in FIG. 3, "received signal" represents a value output from the A/D converter 25 in the form of waveform, and "differential signal" represents a difference value calculated by the difference accumulation circuit 32 in the form of waveform.

An ultrasonic signal is intermittently transmitted in a monitoring area in each transmission period Tp (=300 ms). The waveform of a received signal in a block A0 corresponding to a reflected wave of an ultrasonic signal transmitted in a first transmission period (hereinafter merely referred to as a "received signal") is written into the storage device 31. No processing is performed in a block B0 subsequent to the block A0.

Subsequently, an ultrasonic signal is transmitted in a second transmission period. The difference between the waveform of a received signal in a block A1 corresponding to a reflected wave of the ultrasonic signal transmitted in the second transmission period and the waveform of the received signal in the block A0 stored in the storage device 31 is calculated for each sampling value, and the absolute values of these differences are accumulated. That is, $\Sigma|A1n-A0n|$ is computed where n represents the ordinal number of sampling data. Cumulative sum $\Sigma$ is computed by changing the ordinal number n from an initial value to the number of pieces of sampling data.

A received signal obtained in a block B1 subsequent to the block A1 is newly written in the storage device 31. That is, data stored in the storage device 31 is updated.

Subsequently, an ultrasonic signal is transmitted in a third transmission period. The difference between the waveform of a received signal in a block B2 corresponding to a reflected wave of the ultrasonic signal transmitted in the third transmission period and the waveform of the received signal in the block B1 stored in the storage device 31 is calculated for each sampling value, and the absolute values of these differences are accumulated. That is, $\Sigma|B2n-B1n|$ is computed. Waveform processing is not performed in a block A2.

Subsequently, an accumulation result $\Sigma|A1n-A0n|$ obtained in the block A and an accumulation result $\Sigma|B2n-B1n|$ obtained in the block B are accumulated, and the accumulation result is set as the amount of change. The above-described processing is repeated every detection update period Td (=900 ms).

In this example, the transmission of an ultrasonic signal is performed three times before a detection result is updated. Accordingly, a cumulative time required for the comparison between received signals and detection processing is 10 ms×3=30 ms that is three times longer than that required in the case of an object detection apparatus in the related art. However, since the detection update period Td is 900 ms, there is a spare time of 870 ms. That is, a spare time of 900 ms−30 ms=870 ms is obtained, and it is therefore possible to obtain a detection result within a predetermined detection update period.

If a storage capacity is reduced by 1/m, a time required for the comparison between received signals and the detection processing is tr×(m+1). Accordingly, parameters tr, Tp, and Td are set so that the following conditions are satisfied.

$Td > tr \times (m+1)$ $tr \leq Tp$

The values of tr, Tp, and Td are set to common-sense values in the above-described embodiment, but are not limited thereto.

Figure 5:
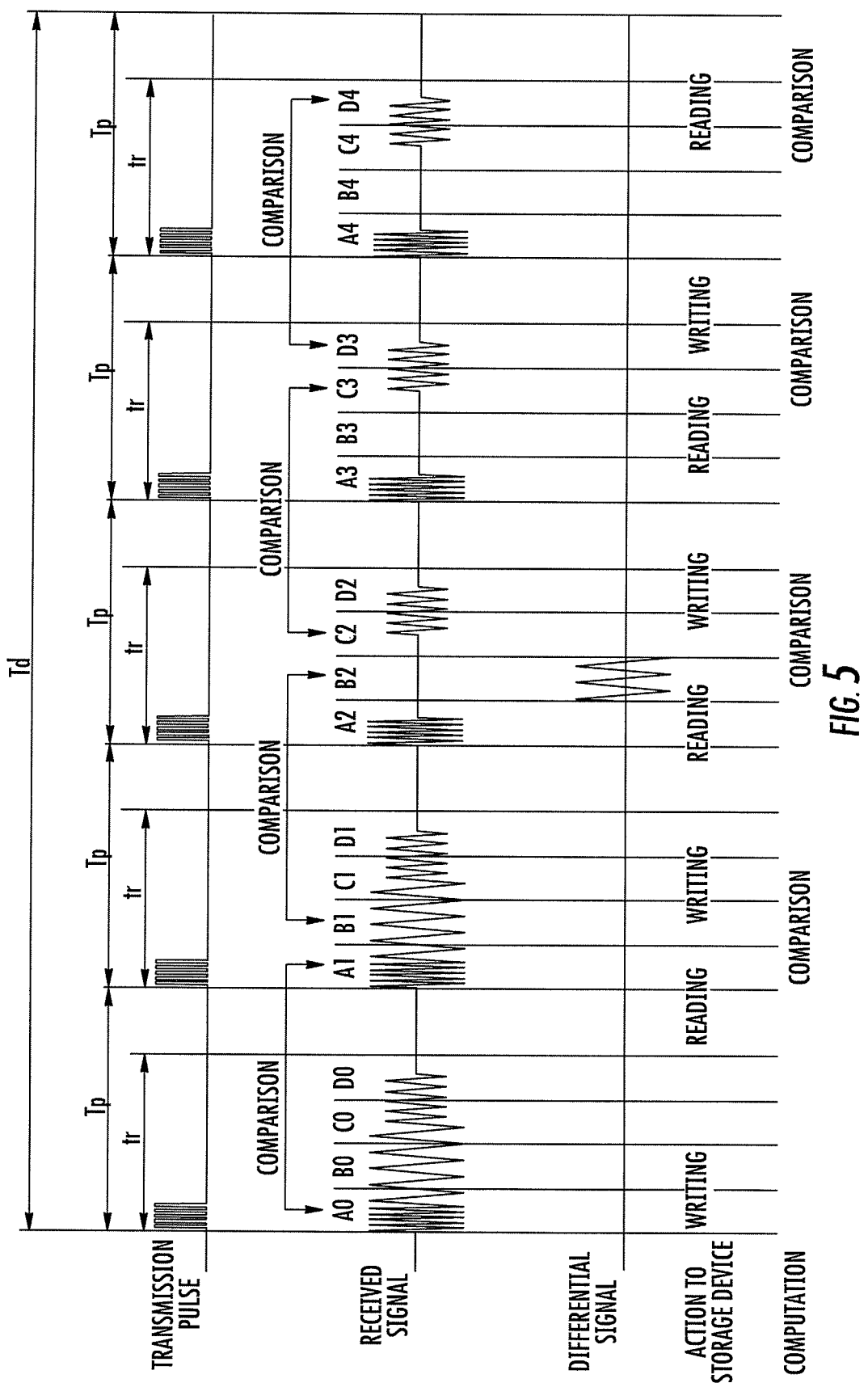
FIG. 5 is a diagram illustrating another sequence of operations performed by the object detection apparatus.

FIG. 5 illustrates an exemplary case in which the reflected wave measurement period tr (=10 ms) is divided into four blocks A, B, C, and D so as to reduce the storage capacity of a storage device to a quarter of the storage capacity of a storage device included in an object detection apparatus in the related art.

Referring to FIG. 5, for simplification of explanation, "action to storage device" and "computation" are used. However, the processing described with reference to FIG. 4 is similarly performed.

The waveform of a received signal in a block A0 corresponding to a reflected wave of an ultrasonic signal transmitted in a first transmission period is written in the storage device 31. In blocks B0 to D0 subsequent to the block A0, no processing is performed.

Subsequently, an ultrasonic signal is transmitted in a second transmission period. The difference between the waveform of a received signal in a block A1 corresponding to a reflected wave of the ultrasonic signal transmitted in the second transmission period and the waveform of the received signal in the block A0 stored in the storage device 31 is calculated for each sampling value, and the absolute values of these differences are accumulated so as to obtain an accumulated value. A received signal obtained in a block B1 is newly written in the storage device 31. In blocks C1 and D1 subsequent to the block B1, no processing is performed.

Subsequently, an ultrasonic signal is transmitted in a third transmission period. The difference between the waveform of a received signal in a block B2 corresponding to a reflected wave of the ultrasonic signal transmitted in the third transmission period and the waveform of the received signal in the block B1 stored in the storage device 31 is calculated for each sampling value, and the absolute values of these differences are accumulated so as to obtain an accumulated value. An accumulated value and the above-described accumulated value are further accumulated. No processing is performed in blocks A2 and D2.

Subsequently, an ultrasonic signal is transmitted in a fourth transmission period. The difference between the waveform of a received signal in a block C3 corresponding to a reflected wave of the ultrasonic signal transmitted in the fourth transmission period and the waveform of a received signal in a block C2 stored in the storage device is calculated for each sampling value, and the absolute values of these differences are accumulated so as to obtain an accumulated value. An accumulated value and the above-described accumulated value are further accumulated. No processing is performed in blocks A3 and B3.

Subsequently, an ultrasonic signal is transmitted in a fifth transmission period. The difference between the waveform of a received signal in a block D4 corresponding to a reflected wave of the ultrasonic signal transmitted in the fifth transmission period and the waveform of a received signal in a block D3 stored in the storage device is calculated for each sampling value, and the absolute values of these differences are accumulated so as to obtain an accumulated value. An accumulated value and the above-described accumulated value are further accumulated. No processing is performed in blocks A4 to C4.

The accumulated value at that time is set as the amount of change. The above-described processing is repeated every detection update period Td (=900 ms).

In the exemplary cases illustrated in FIGS. 4 and 5, received signals obtained in corresponding waveform comparison periods in adjacent transmission periods are compared with each other. However, received signals obtained in corresponding waveform comparison periods in transmission periods that are apart from each other may be compared with each other.

In the exemplary cases illustrated in FIGS. 4 and 5, since reading of waveform data from the storage device and writing of waveform data in the storage device are performed in a single transmission period, the detection update period Td can be reduced. However, the reading of waveform data from the storage device and the writing of waveform data in the storage device may be performed in different transmission periods on the condition that a required detection result update period can be acquired.

A detection result may not necessarily be updated every detection result update time. A detection result indicating that an object (a person) has been detected may be output (for example, a buzzer may sound) immediately when the amount of change exceeds a threshold value set in advance.

In the above-described exemplary cases, an ultrasonic signal is transmitted or received. However, a "detection wave" according to the present invention is not limited to an ultrasonic signal, and may be another wave, for example, a sound wave. The present invention can similarly be applied to any case in which the transmission of a detection wave and the reception of a reflected wave are periodically repeated every transmission period, and comparing one received signal with another received signal at a similar corresponding comparison periods in different transmission periods of a receiving time of the reflected wave over a predetermined time.

The invention claimed is:

1. An object detection apparatus that transmits a detection wave, receives a reflected wave of the detection wave from an object, and detects the object on the basis of a received signal corresponding to the reflected wave, the object detection apparatus comprising:
   a received signal comparer that periodically repeats transmission of the detection wave and reception of the reflected wave over a plurality of transmission periods, compares a first received signal in a first transmission period of the plurality of transmission periods with a second received signal in a second transmission period of the plurality of transmission periods, the first and second received signals being within similar first corresponding comparison periods based on a received time of the reflected wave over a predetermined time; and
   a comparison period switcher that switches from the similar first corresponding comparison periods to similar second corresponding comparison periods when the transmission period is changed.

2. The object detection apparatus according to claim 1, wherein the received signal comparer stores in a storage device a waveform of a signal intensity received in the first transmission period and compares the stored waveform in the storage device with a waveform of a signal intensity received in the second transmission period.

3. The object detection apparatus according to claim 2, wherein reading of waveform data and writing of waveform data are performed in a single transmission period.

4. The object detection apparatus according to claim 1, wherein the first and second transmission periods are adjacent transmission periods to each other.

* * * * *